(12) United States Patent
Yin et al.

(10) Patent No.: US 8,840,283 B2
(45) Date of Patent: Sep. 23, 2014

(54) LIGHT SOURCE MODULE

(75) Inventors: Nan-Jiun Yin, Hsin-Chu (TW);
Shiuan-Ting Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 408 days.

(21) Appl. No.: 12/897,779

(22) Filed: Oct. 4, 2010

(65) Prior Publication Data

US 2011/0096557 A1 Apr. 28, 2011

(30) Foreign Application Priority Data

Oct. 23, 2009 (CN) ...................... 2009 2 0267804 U

(51) Int. Cl.
*F21V 19/00* (2006.01)
*F21V 21/00* (2006.01)
*G03B 21/20* (2006.01)

(52) U.S. Cl.
CPC ..................................... *G03B 21/20* (2013.01)
USPC ................. 362/382; 362/249.02; 362/249.04; 362/631; 362/646; 361/807; 361/809; 361/810; 353/52; 353/57; 353/58

(58) Field of Classification Search
USPC ........ 362/249.02, 249.04, 631, 646; 361/807, 361/809, 810; 353/52, 57, 58
See application file for complete search history.

(56) References Cited

U.S. PATENT DOCUMENTS

| | | | | |
|---|---|---|---|---|
| 6,793,343 | B2 * | 9/2004 | Nakano et al. | 353/61 |
| 7,300,182 | B2 * | 11/2007 | Mazzochette | 362/294 |
| 7,845,803 | B2 * | 12/2010 | Lv et al. | 353/52 |
| 8,197,099 | B2 * | 6/2012 | Oyaizu et al. | 362/294 |
| 8,198,809 | B2 * | 6/2012 | Mo et al. | 313/512 |
| 2007/0096272 | A1 * | 5/2007 | Wang | 257/675 |
| 2009/0140271 | A1 * | 6/2009 | Sah | 257/88 |
| 2010/0085542 | A1 * | 4/2010 | Hsieh | 353/52 |
| 2011/0133239 | A1 * | 6/2011 | Lin | 257/99 |

FOREIGN PATENT DOCUMENTS

TW 200743866 12/2007

* cited by examiner

*Primary Examiner* — Thomas M Sember
*Assistant Examiner* — Tsion Tumebo
(74) *Attorney, Agent, or Firm* — Jianq Chyun IP Office

(57) ABSTRACT

A light source module is adapted for a projection apparatus. The projection apparatus has a main board. The light source module includes a base, a lighting element, a flexible printed circuit, and a plurality of metal elastic elements. The base has a circuit layer. The lighting element is disposed on the base and electrically connected to the circuit layer. The flexible printed circuit is assembled on the base and electrically connected to the circuit layer. The metal elastic elements are adapted for being fixed to the main board to be contacted with the flexible printed circuit, such that the flexible printed circuit is electrically connected to the main board. The lighting element of the light source module is electrically connected to the main board via the flexible printed circuit and the metal elastic elements, such that a wiring space between the light source module and the main board is reduced.

8 Claims, 4 Drawing Sheets

LIGHT SOURCE MODULE

CROSS-REFERENCE TO RELATED APPLICATION

This application claims the priority benefit of China application serial no. 200920267804.2, filed on Oct. 23, 2009. The entirety of the above-mentioned patent application is hereby incorporated by reference herein and made a part of this specification.

BACKGROUND OF THE INVENTION

1. Field of Invention

The invention relates to a light source module, and more particularly, to a light source module adapted for a projection apparatus.

2. Description of Related Art

A light source module is required to supply light for a liquid crystal display (LCD) device to display frames. For example, Taiwan Patent Publication No. 200743866 discloses a backlight source device used for providing the light required by the LCD to display frames.

A projector is also a display apparatus with a light source module to generate a large-sized frame. According to an imaging principle of projectors, a beam generated by the light source module is converted into an image beam via a light valve. Afterwards, the image beam passes through the lens and is projected onto a screen or a wall. With recent advancement in projection techniques and reduction in manufacturing cost of projectors, applications of projectors have been gradually expanded from commercial use to household use.

In general, a lighting element of a light source module may be electrically connected to a main board via conductive lines, such that power is able to be supplied by the main board. However, the smaller the size of a projector is, the smaller a wring space between a main board and a light source module is. Thus, it is difficult to wire.

SUMMARY OF THE INVENTION

The invention provides a light source module adapted for a projection apparatus and a wiring space between a light source module and a main board of the projection apparatus is reduced.

Other objects and advantages of the invention may be further illustrated by the technical features broadly embodied and described as follows.

In order to achieve at least one of the objects or other objects, one embodiment of the invention provides a light source module adapted for a projection apparatus. The projection apparatus has a main board. The light source module includes a base, a lighting element, a flexible printed circuit, and a plurality of metal elastic elements. The base has a circuit layer. The lighting element is disposed on the base and is electrically connected to the circuit layer. The flexible printed circuit is assembled on the base and is electrically connected to the circuit layer. The metal elastic elements are adapted for being fixed to the main board to be contacted with the flexible printed circuit, such that the flexible printed circuit is electrically connected to the main board.

In one embodiment of the invention, the flexible printed circuit is soldered to the circuit layer.

In one embodiment of the invention, the flexible printed circuit has a plurality of electrodes, and the electrodes are respectively contacted with the metal elastic elements.

In one embodiment of the invention, the lighting element is a light emitting diode light source.

In one embodiment of the invention, a material of the base is metal.

In one embodiment of the invention, the light source module further comprises: an optical engine base, wherein the base and the flexible printed circuit are assembled on the optical engine base.

In one embodiment of the invention, the flexible printed circuit has a segment and the segment is located among the optical engine base and the metal elastic elements, and the main board is adapted for being fixed to the optical engine base, such that the metal elastic elements are pressed tightly against the segment of the flexible printed circuit.

In one embodiment of the invention, the flexible printed circuit has a plurality of electrodes, the electrodes are located on the segment and the metal elastic elements are respectively pressed tightly against the electrodes.

In one embodiment of the invention, the segment is fastened to the optical engine base.

In one embodiment of the invention, the optical engine base has a pedestal, the segment is fastened to the pedestal and located among the pedestal and the metal elastic elements.

Based on the above mentions, in the embodiments of the invention, the lighting element of the light source module is electrically connected to the main board via the flexible printed circuit and the metal elastic elements, such that a wiring space between the light source module and the main board is reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back,", etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
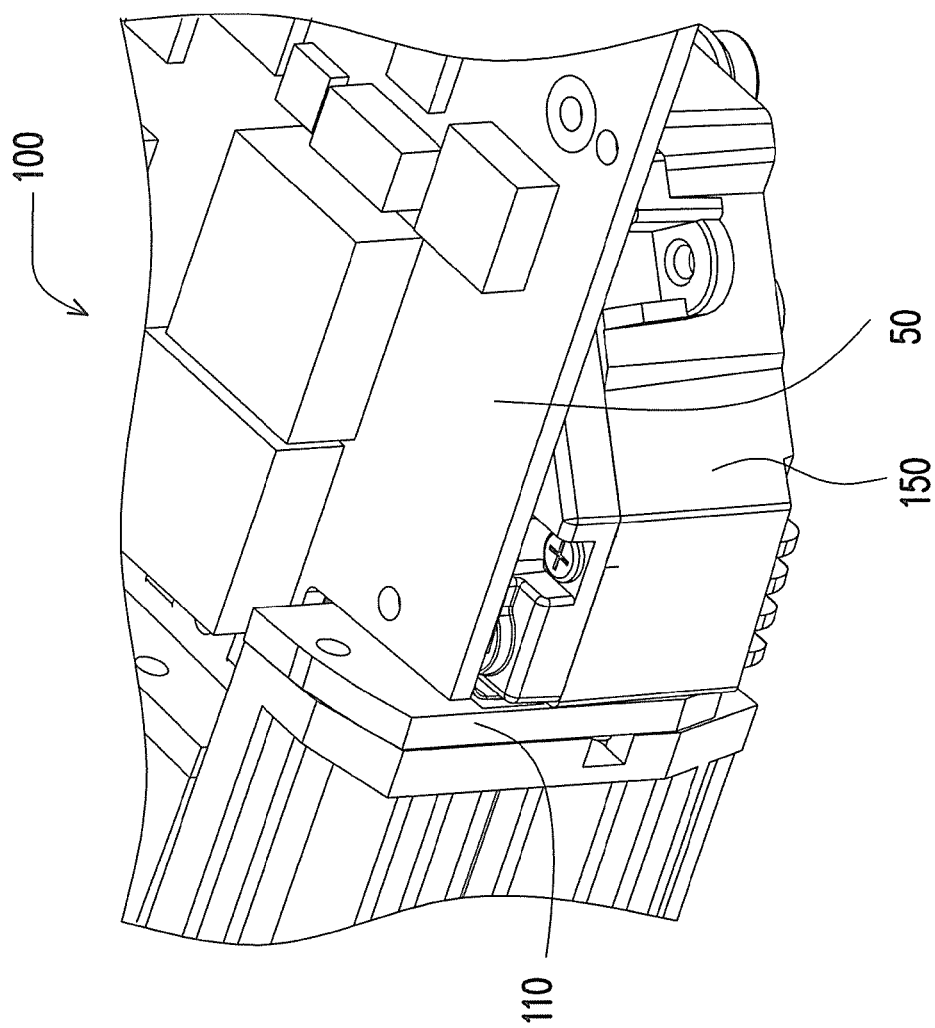
FIG. 1 is a perspective view of a light source module applied to a projection apparatus according to an embodiment of the invention.

Referring to FIG. 1, the light source module 100 of the embodiment is adapted for a projection apparatus (not shown), and the projection apparatus has a main board 50. Then, referring to FIG. 2 to FIG. 4, the light source module 100 includes a base 110, a lighting element 120, a flexible printed circuit 130, and a plurality of metal elastic elements 140 (shown in FIG. 5 as well). In the embodiment, the lighting element 120 is, for example, a light emitting diode (LED) light source, used for providing light beams required by projection apparatus.

The base 110 has a circuit layer 112. The lighting element 120 is disposed on the base 110 and is electrically connected to the circuit layer 112. The flexible printed circuit 130 is assembled on the base 110 and is electrically connected to the circuit layer 112. In the embodiment, the flexible printed circuit 130 is connected to the circuit layer 112 by, for example, welding. The metal elastic elements 140 are fixed to the main board 50 to be contacted with the flexible printed circuit 130, such that the flexible printed circuit 130 is electrically connected to the main board 50.

Compared with the conductive lines of conventional art, which is electrically connected a lighting element and a main board and has a limitation of minimal length, the flexible printed circuit 130 of the embodiment used for electrically connecting the lighting element 120 and the main board 50 may not have a limitation of minimum length limitation. Therefore, the light source module 100 is more flexible in design.

Figure 2:
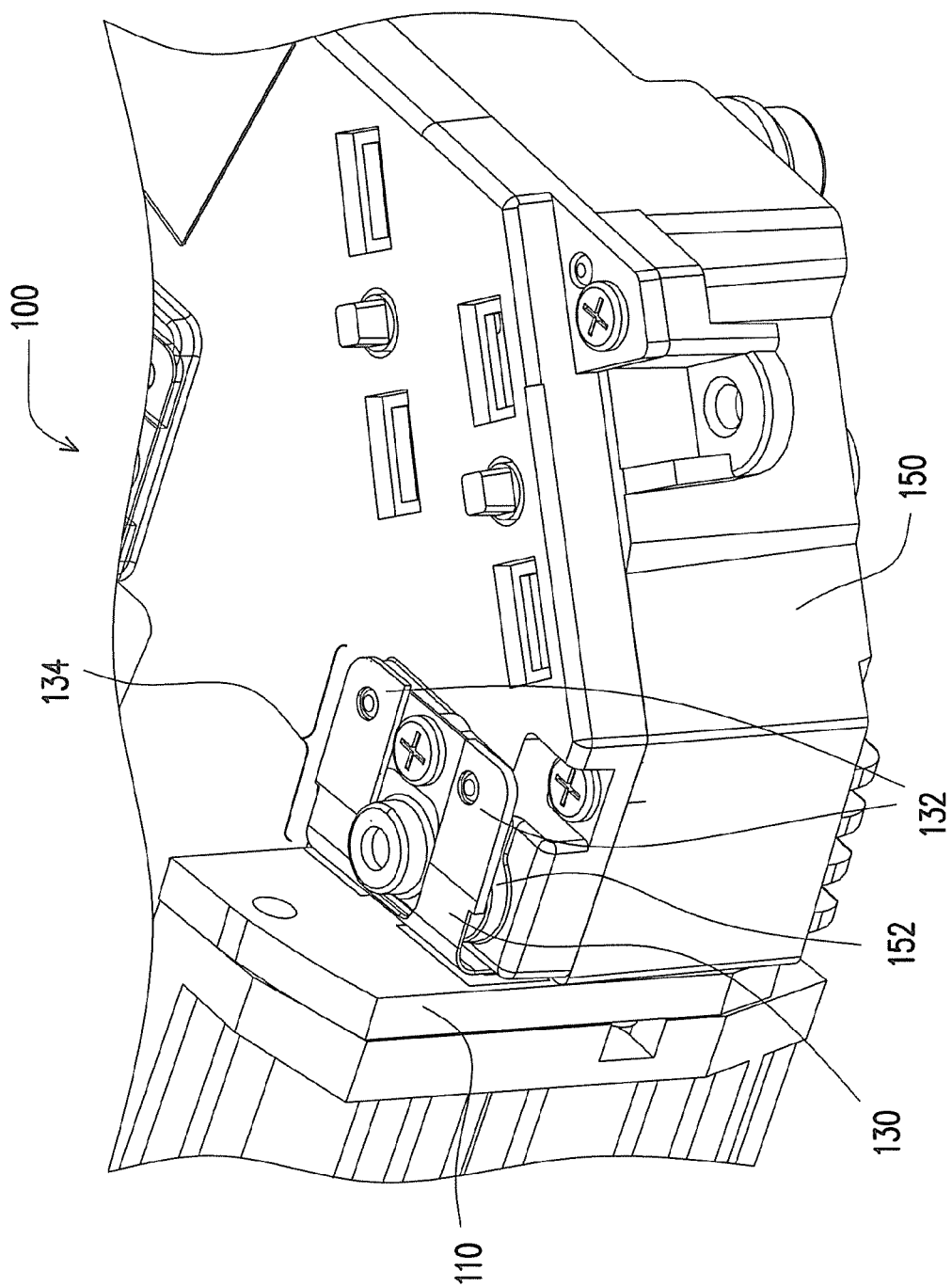
FIG. 2 is a partial perspective view of the light source module of FIG. 1.
Figure 3:
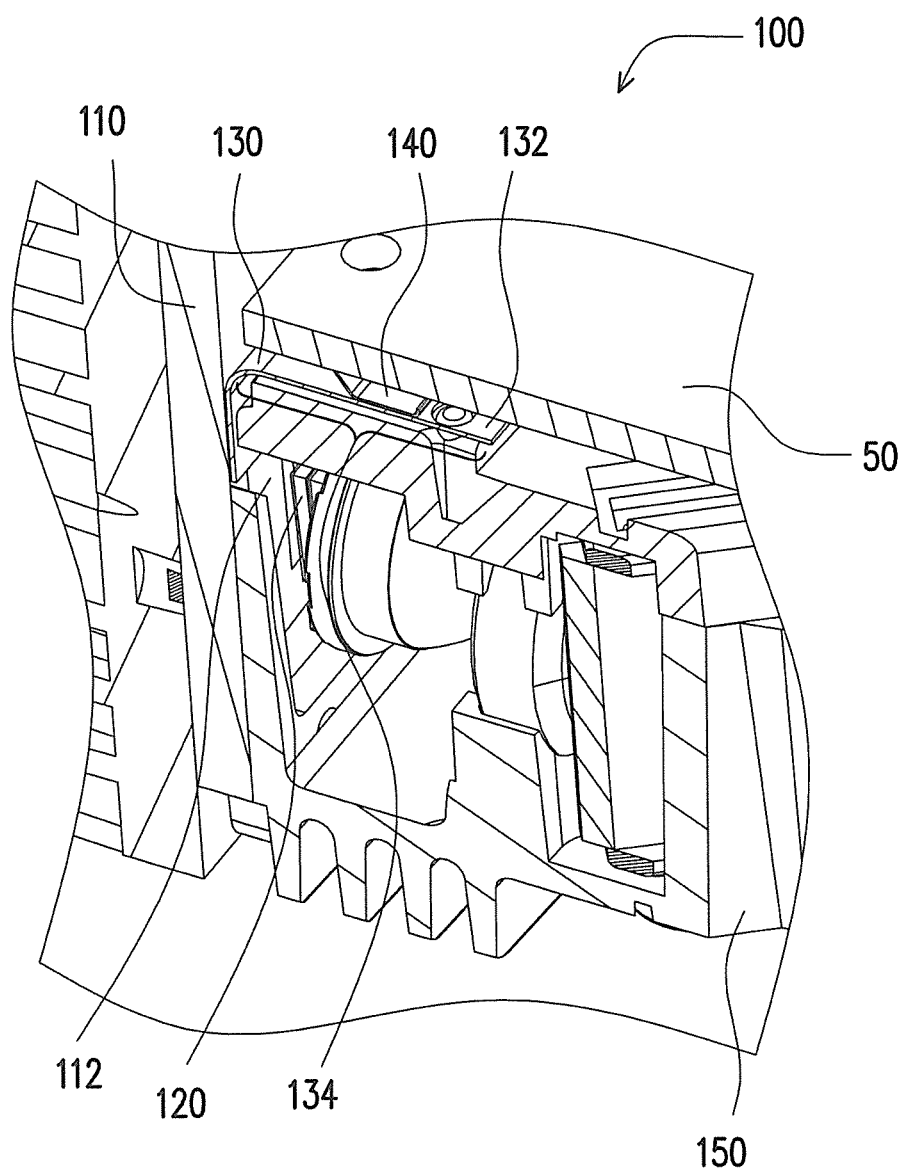
FIG. 3 is a partial cross-sectional view of the light source module of FIG. 1.
Figure 4:
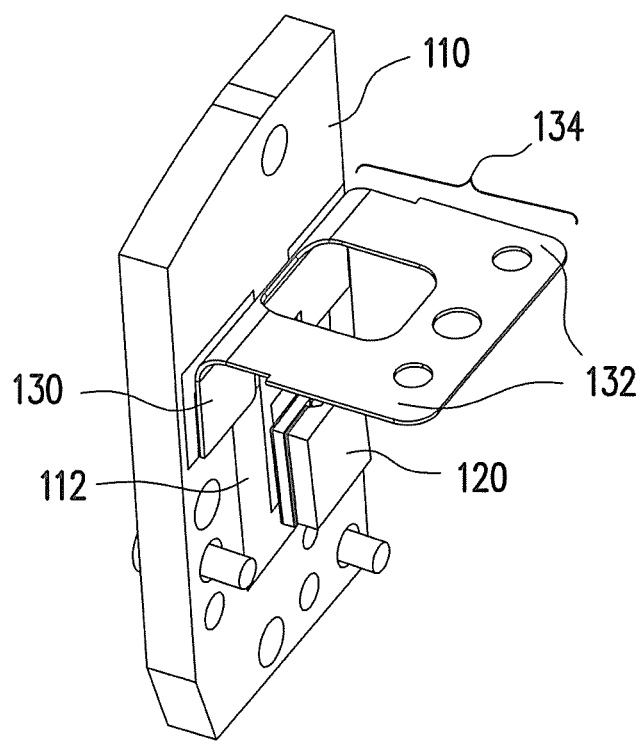
FIG. 4 is a partial perspective view of the light source module of FIG. 1.
Figure 5:
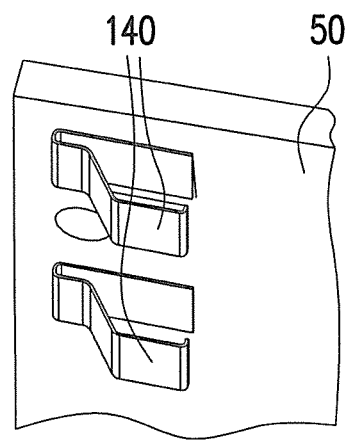
FIG. 5 is a perspective view of the main board and the metal elastic elements of FIG. 1.

Referring to FIG. 5, the number of the metal elastic elements 140 is two, for example. Referring to FIG. 2 and FIG. 3, the flexible printed circuit 130 has a plurality of electrodes 132 (two are shown). The electrodes 132 are respectively contacted the metal elastic elements 140, such that the flexible printed circuit 130 is electrically connected to the main board 50.

Moreover, the light source module 100 further includes an optical engine base 150, and the base 110 and the flexible printed circuit 130 are assembled on the optical engine base 150. The optical engine base 150 may include some elements, e.g. a light valve (not shown) and a lens (not shown), for cooperating with the lighting element 120 to provide light for the projection apparatus. In the embodiment, a material of the base 110 is, for example, metal or other suitable materials facilitating heat dissipation.

In detail, the flexible printed circuit 130 of the embodiment has a segment 134 located among the optical engine base 150 and the metal elastic elements 140. The segment 134 is fixed to the optical engine base 150, and the main board 50 is fixed to the optical engine base 150, such that the metal elastic elements 140 are pressed tightly against the segment 134 of the flexible printed circuit 130. In the embodiment, the electrodes 132 of the flexible printed circuit 130 are located on the segment 134, and the metal elastic elements 140 may be fixed and electrically connected to the main board 50 by, for example, welding. Besides, the metal elastic elements 140 are respectively pressed tightly against the electrodes 132.

Furthermore, the optical engine base 150 may has a pedestal 152, and the segment 134 is fastened to the pedestal 152 and located among the pedestal 152 and the metal elastic elements 140. A user is able to determine the position and the height of the pedestal 152 according to the dimensions and the positions of the flexible printed circuit 130, the main board 50 and the metal elastic element 140, such that the optical engine base 150 is capable of being assembled with each of the elements smoothly.

In summary, in the embodiment of the invention, the lighting element of the light source module is electrically connected to the main board via the flexible printed circuit and the metal elastic elements, such that a wiring space between the light source module and the main board is reduced. Besides, the metal elastic elements assembled on the main board are pressed tightly against the flexible printed circuit, such that the flexible printed circuit is reliably electrically connected to the main board.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module and a projection apparatus having a main board, the light source module comprising:
    a base having a circuit layer;
    a lighting element disposed on the base and electrically connected to the circuit layer;
    a flexible printed circuit assembled on the base and electrically connected to the circuit layer;
    a plurality of metal elastic elements fixed to the main board to be contacted with the flexible printed circuit, and the flexible printed circuit is electrically connected to the main board; and
    an optical engine base, wherein the base and the flexible printed circuit are assembled on the optical engine base;
    wherein the flexible printed circuit has a segment and the segment is located among the optical engine base and the metal elastic elements, and the main board is fixed to the optical engine base, such that the metal elastic elements are pressed tightly against the segment of the flexible printed circuit; and a power is supplied sequentially through the metal elastic elements, the flexible printed circuit and the circuit layer by the main board to the light source module.

2. The light source module and the projection apparatus of claim 1, wherein the flexible printed circuit is soldered to the circuit layer.

3. The light source module and the projection apparatus of claim 1, wherein the flexible printed circuit has a plurality of electrodes, and the electrodes are respectively contacted with the metal elastic elements.

4. The light source module and the projection apparatus of claim 1, wherein the lighting element is a light emitting diode light source.

5. The light source module and the projection apparatus of claim 1, wherein a material of the base is metal.

6. The light source module and the projection apparatus of claim 1, wherein the flexible printed circuit has a plurality of electrodes, the electrodes are located on the segment and the metal elastic elements are respectively pressed tightly against the electrodes.

7. The light source module and the projection apparatus of claim 1, wherein the segment is fastened to the optical engine base.

8. The light source module and the projection apparatus of claim 1, wherein the optical engine base has a pedestal, the segment is fastened to the pedestal and located among the pedestal and the metal elastic elements.

* * * * *